United States Patent [19]

Kiteley

[11] 4,297,619
[45] Oct. 27, 1981

[54] PHOSPHOR PROTECTION CIRCUIT FOR MULTIPLE CRT PROJECTION TELEVISION

[75] Inventor: Terence J. Kiteley, Schaumburg, Ill.

[73] Assignee: Zenith Radio Corporation, Glenview, Ill.

[21] Appl. No.: 222,205

[22] Filed: Jan. 2, 1981

[51] Int. Cl.³ .............................................. H01J 29/52
[52] U.S. Cl. ........................................ 315/381; 358/60
[58] Field of Search ..................... 315/381, 383, 411; 358/60, 165, 168, 190, 220

[56] References Cited

PUBLICATIONS

Quasar Electronics Co. Chassis AMVDTS-800 Service Manual, Model No. PR6800QW, 1978.

Primary Examiner—Theodore M. Blum
Attorney, Agent, or Firm—Jack Kail; Thomas E. Hill

[57] ABSTRACT

A system for preventing CRT phosphor burn in a multiple CRT projection type television system is disclosed. The absence of an electron beam deflection signal in the deflection yoke of a CRT is detected and used to provide a signal to CRT shutdown circuitry by means of an unbalanced transformer approach in which the various deflection yoke signals energize a plurality of primary transformer coils with a shutdown signal provided by the transformer secondary when a primary coil flux unbalance occurs.

24 Claims, 3 Drawing Figures

4,297,619

PHOSPHOR PROTECTION CIRCUIT FOR MULTIPLE CRT PROJECTION TELEVISION

BACKGROUND OF THE INVENTION

This invention relates generally to multiple CRT projection type television systems, and particularly relates to a system for preventing CRT phosphor burn in a multiple CRT projection type television system.

A common type of projection television system includes three cathode ray tubes disposed side by side relative to one another each emitting a light beam of one of the three different primary colors, red, green and blue, onto a generally planar projection screen through a lens assembly. The three different color light beams form a proper colored picture when they are projected onto the projection screen in such a manner that images of different color are superimposed upon one another without any displacement.

The three cathode ray tube (CRT) projection color television receiver approach as well as other projection television system approaches have suffered from inherent limitations in the brightness of the reproduced image on the projection screen. These limitations have necessitated a darkened viewing environment for optimum projection television receiver viewing. Other equally undesirable conditions from the viewer's standpoint have been caused by limitations in video display brightness and contrast in a projection television receiver. These limitations result from various characteristics of the projection television environment such as light losses in the image projection lens system, absorption and dispersion of the light energy containing image information incident upon the projection screen, reflection losses if a mirror system is used, and the large size of the projection screen relative to the total surface area of the three CRT's employed in the projection television system. To compensate for these inherent projection television system limitations, substantial effort has been expended to enhance the images produced by the individual CRT's.

The principle elements in the tubes are an electron gun, a target coated with a phosphor upon a surface directly facing the impinging electron beam, various mirror and/or lens combinations to achieve the desired optical effects, and a transparent faceplate through which the image is projected upon a screen external to the CRT's envelope. The most common approach to increasing image intensity, or brightness, is to increase the inter-electrode voltages which accelerate the electrons toward the phosphor-coated faceplate. This has resulted in an increased danger of permanently damaging the CRT's screen by means of a continuous beam of undeflected, energetic electrons impinging on the same spot, or small area, when deflection voltages are removed. During normal operation the electron beam is swept vertically and horizontally across the CRT faceplate. Should a vertical or horizontal deflection yoke malfunction or be deprived of appropriate deflection signals during operation, a permanent mark will be "burned" on the phosphor coating of the CRT's faceplate in the form of a spot or a horizontal or vertical line. This is not a new problem brought on by the advent of projection television systems, for there is much in the prior art addressing this problem in conventional television receivers, but it is only of recent that this problem has been dealt with in the context of a projection television system environment.

One approach to protecting the projection television system's CRT faceplate is disclosed in Quasar Electronics Company Service Manual for projection television chassis AMVDTS-800 published in 1978 by Matsushita Electric Corporation of America. FIG. 1 shows the horizontal deflection yoke open circiut detector system described in a detailed schematic in the referenced Quasar Service Manual. Under normal conditions with current flowing through green 13, blue 15 and red 17 deflection yokes, the magnetic effects in transformer 11 and 19 caused by the current flowing through coils L2 and L3 in each of the transformers cancels out. Thus, under normal operating conditions no current is induced in windings L1 of transformers 11 and 19. With no composite pulse induced in the L1 windings, diode 21 which is connected to them in series detects no voltage. However, during abnormal operation of any of the three deflection yokes, an output voltage is provided to diode 21 in the following manner. If blue deflection yoke 15 ceases to induce a positive pulse in the L3 winding of transformer 11, the L1 winding in that transformer becomes unbalanced because of the presence of only the positive pulse induced by L2. Since transformer 19 does not include a winding from blue deflection yoke 15, L1 in transformer 19 remains balanced. Diode 21 detects and rectifies only the positive pulse form from the L1 winding to transformer 11 and this output is used to control beam current shutoff circuitry. Failure of either the red or green deflection yokes 17 or 13, respectively, will produce the same unbalanced flux condition in transformers 11 and 19 producing a resultant output pulse used to drive CRT shutdown circuitry. Transformer 23 is used to detect failure of all three deflection yokes and to generate an output signal for CRT shutdown in response thereto. This approach thus requires three separate transformers which reduces its reliability.

These and other problems encountered in the prior art are avoided by the present invention which provides a system for preventing CRT phosphor burn in a multiple CRT projection type television system by means of a single transformer in each of the vertical and horizontal deflection systems.

OBJECTS OF THE INVENTION

Accordingly, it is an object of the present invention to provide an improved means for detecting the absence of a proper horizontal or vertical sweep signal in the deflection yoke of a CRT operating in a multiple CRT projection type television receiver.

It is another object of the present invention to provide an improved means for detecting an open circuit or short circuit condition in the horizontal or vertical yoke deflection windings of a CRT operating in a multiple CRT projection type television receiver.

Still another object of the present invention is to provide an inexpensive and reliable system for preventing CRT phosphor burn in a multiple CRT projection type television receiver.

BRIEF DESCRIPTION OF THE DRAWINGS

The appended claims set forth those novel features believed characteristic of the invention. However, the invention itself, as well as further objects and advantages thereof, will best be understood by reference to the following detailed description of a preferred embodiment taken in conjunction with the accompanying drawings in which:

DESCRIPTION OF THE PREFERRED EMBODIMENTS

Figure 1:
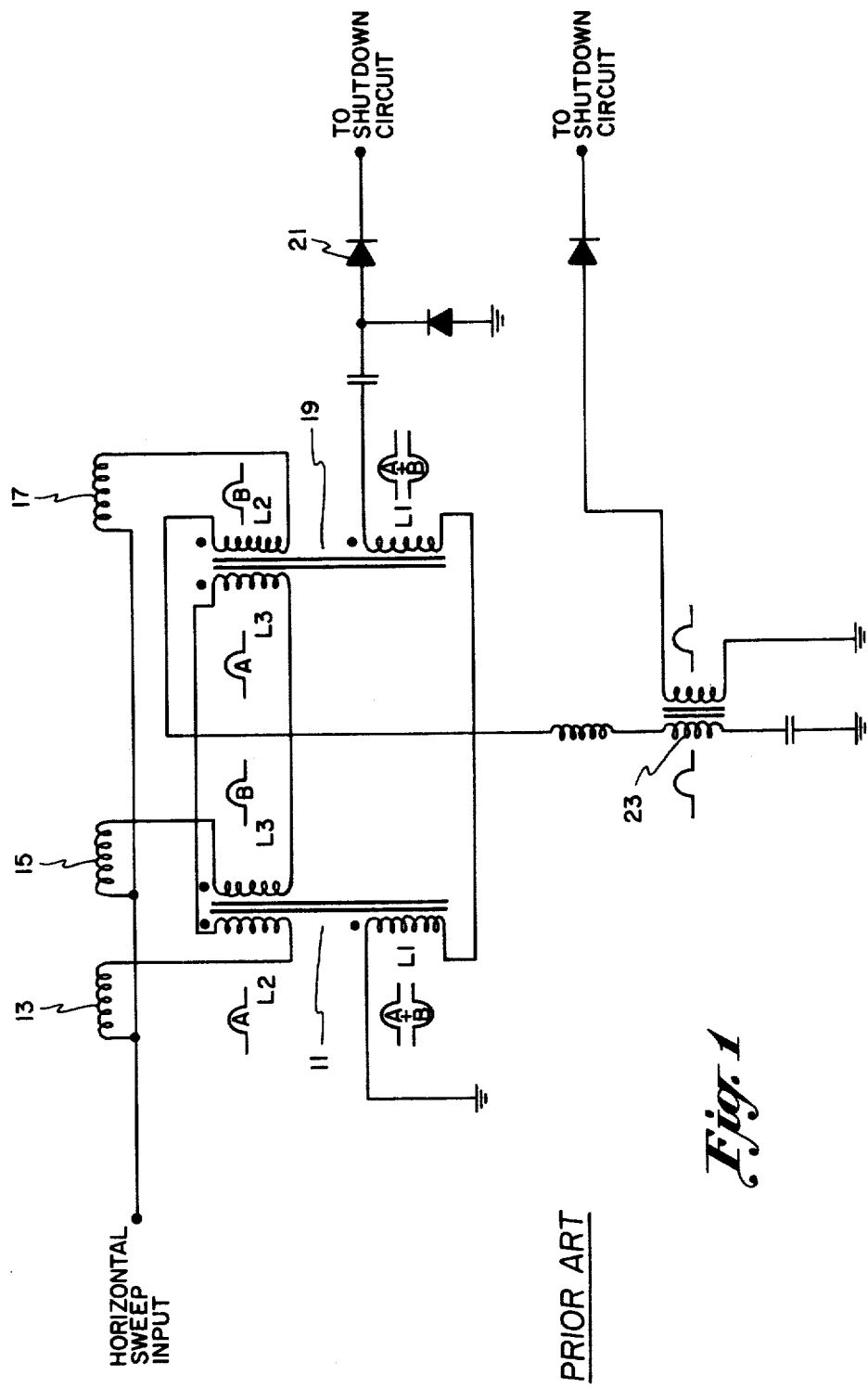
FIG. 1 shows a prior art system for detecting a malfunction in the horizontal deflection yoke system of a multiple CRT projection television system.
Figure 2:
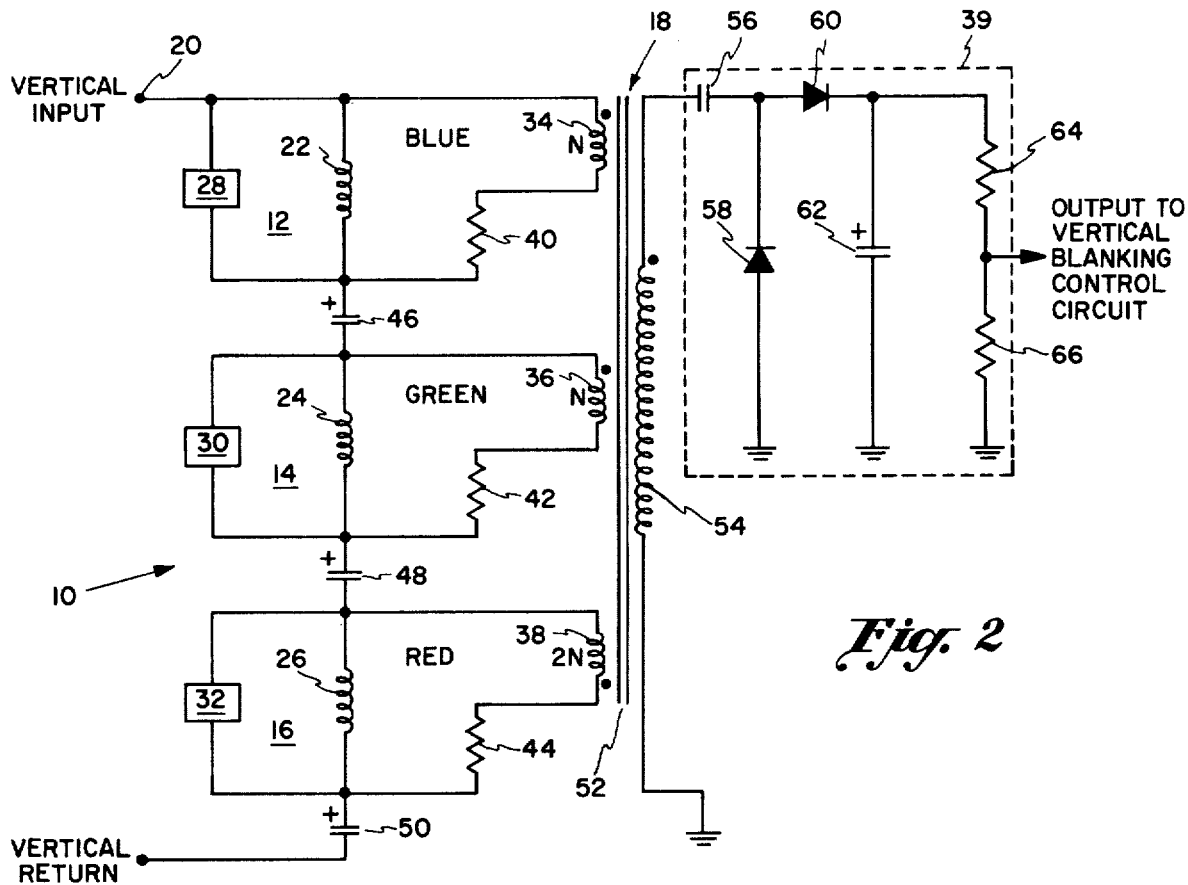
FIG. 2 which is partially in block diagram form and partially in schematic diagram form shows a phosphor protection circuit for use in the vertical deflection system of a multiple CRT projection television system in accordance with the present invention.

Referring to FIG. 2, there is shown a phosphor protection circuit 10 for use in the vertical deflection system of a multiple CRT projection television system in accordance with the present invention. A vertical input signal having a general sawtooth waveform upon which is superimposed a vertical flyback pulse is provided at input terminal 20. Three CRT's (not shown) having phosphor screeens for producing and projecting the three primary colors of blue, green and red in the form of a light beam onto a projecting screen are generally utilized in a multiple cathode ray tube projection television system. Each CRT possesses its own vertical and horizontal deflection systems for the two dimensional, synchronized electron beam trace on the CRT's glass faceplate. The vertical deflection systems are shown in FIG. 1 as elements 12, 14 and 16 for proper vertical deflection of the blue, green and red electron beam-generated color components. Theese three electron beam deflection yokes are connected serially, with capacitor 46 coupling the blue and green vertical deflection systems 12 and 14, capacitor 48 coupling the green and red vertical deflection systems 14 and 16, and capacitor 50 coupling the red deflection system 16 to the vertical input power supply (not shown) in a feedback signal return arrangement. Capacitors 46, 48 and 50 provide DC isolation between the individual deflection stages in reducing interference currents within or between the vertical deflection stages.

Figure 3:
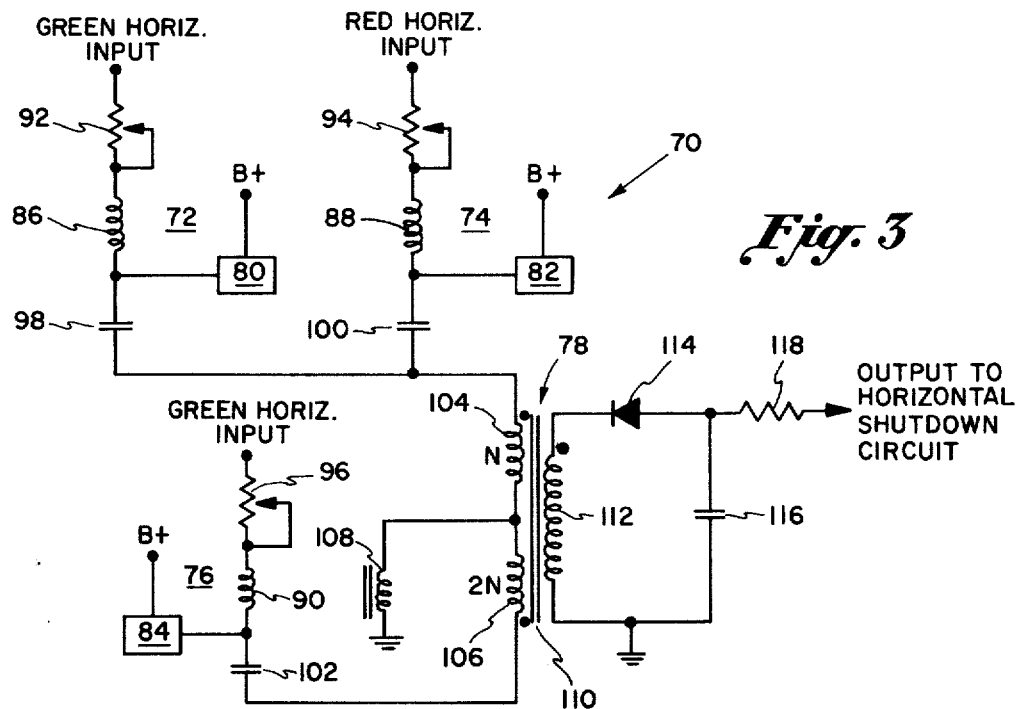
FIG. 3 which also is partially in block diagram form and partially in schematic diagram form shows a phosphor protection circuit for use in the horizontal deflection system of a multiple CRT projection television system in accordance with the present invention.

Incorporated in each deflection stage is a centering control, a linearity control and a size control collectively indicated as elements 28, 30 and 32, respectively, in the blue 12, green 14 and red 16 vertical deflection stages. These video display control systems are generally coupled in parallel across an associated deflection yoke and permit the deflection action of the yoke on the corresponding electron beam to be precisely manipulated. Because the exact configuration utilized for controlling video display centering, linearity and size is not a part of the present invention, which is compatable with any of the more generally used display control systems, a detailed description of these control systems as envisioned in both the vertical deflection phosphor burn protection circuit 10 of FIG. 2 and the horizontal deflection phosphor burn protection circuit 70 of FIG. 3 is not provided herein.

In accordance with a preferred embodiment of the present invention, coils 34, 36 and 38 are coupled in parallel across deflection yokes 22, 24 and 26, respectively. Each of coils 34, 36 and 38 form a primary winding of transformer 18 which also includes a core of laminated iron material 52 and a secondary coil 54 inductively coupled to each of the primary coils. Coils 34 and 36 contain the same number of turns N and are wound in the same direction, or have the same polarity. Winding 38 contains twice the number of turns, or 2 N turns, of coils 34 and 36 individually and is wound in the opposite direction from these two coils, or has a polarity opposite to that of coils 34 and 36. Resistors 40, 42 and 44 are connected in series with associated primary sensing coils 34, 36 and 38 and are coupled in shunt across deflection yokes 22, 24 and 26, respectively. The values of resistors 40, 42 and 44 are selected such that under normal conditions only a small portion of the input signal passes through the primary sensing coils with most of the current passing through deflection yokes 22, 24 and 26. This permits a high level of positioning control over the individual electron beams.

If an open circuit occurs across one of the deflection yokes, current is shunted through the corresponding sensing primary coil. Similarily, if a short circuit occurs across one of the deflection yokes, current is drawn from the associated sensing primary coil. In the first case the current through one of the sensing primary coils would be increased, while in the second situation a decrease in the current through one of the sensing primary coils 18 would occur. In both cases an imbalance would occur between the magnetic fluxes in transformer core 52 produced by sensing primary coils 34, 36 and 38. Under ordinary conditions the flux produced in transformer 18 by the three sensing primary coils, due to their relative number of turns and polarity, would be zero due to the mutual cancelling effect of each of the sensing primary coils 34, 36 and 38. When one of the aforementioned conditions occurs, however, a flux imbalance is established in transformer 18 with the result that current is induced in secondary winding 54.

One end of secondary winding 54 is coupled to neutral ground potential while the other end is connected to a shutdown circuit 39. Shutdown circuit 39 includes the combination of capacitor 56 and diode 58 which form a voltage doubler circuit. The doubled output voltage of secondary winding 54 is then rectified by means of diode 60 and capacitor 62. The negative electrodes of diode 58 and capacitor 62 are coupled to neutral ground potential. The output signal of secondary winding 54, produced by the transformer flux imbalance caused by changes in the current passing through primary sensing coils, 34, 36 and 38, after having been doubled and rectified, is then divided down by means of resistors 64 and 66 which also are coupled to neutral ground potential. The output signal in the preferred embodiment of the present invention is coupled to a conventional high voltage shutdown circuit the details of which are not shown as it does not form a part of the present invention.

In the vertical deflection system shown in FIG. 2, therefore, the current through the three deflection yokes is used to establish a balanced magnetic flux in balanced bridge transformer 18. When an irregularity in the operation of one of the deflection yokes occurs, such as a short or an open circuit, the bridge transformer becomes unbalanced and the change in the input flux induces a voltage in secondary winding 54 thus producing an output signal which is provided to high voltage shutdown circuitry. In this manner line or spot burn of the CRT's faceplate phosphor is avoided.

Shown in FIG. 3 is a phosphor protection circuit 70 for use in the horizontal deflection system in a multiple CRT projection television receiver in accordance with a preferred embodiment of the present invention. Synchronized horizontal sweep inputs are provided to each of the blue 72, red 74, and green 76 horizontal deflection stages. Each horizontal deflection stage includes a horizontal deflection yoke 86 (blue), 88 (red) and 90 (green) by means of which the electron beam in each of the three primary color CRT's is synchronously swept back and forth across the CRT's phosphor-coated faceplate. Coupled in series with each horizontal deflection coil in a variable resistance linearity control, 92, 94 and 96 in the blue, red and green horizontal deflection systems, respectively. These linearity controls permit the manual adjustment of horizontal linearity of the video display. Horizontal centering circuitry 80, 82 and 84 is also connected to each of the blue 86, red 88 and green 90 deflection yokes, respectively. Such video display centering circuitry is well known in the art and permits the various color component images to be accurately positioned on the projection television's screen. In addition, blue 80, red 82 and green 84 horizontal centering circuits provide a source of B+ voltage to other projection television receiver systems.

Horizontal blue 72, red 74 and green 76 deflection stages are coupled to two primary windings of balanced transformer 78 by means of capacitors 98, 100 and 102, respectively. These capacitors provide "S"-shaping or correction, of the sawtooth-shaped horizontal sweep input signal delivered to primary windings 104 and 106. This S-correction eliminates video display distortion caused by the planar nature of the projection screen as it relates to the geometry of the three CRT configuration. As shown in FIG. 3, primary coils 104 and 106 are wound in opposite directions with coil 106, which is coupled only to green horizontal drive stage 76, having twice the number of turns 2 N of coil 104. Primary coil 104 is coupled to the parallel arrangement of blue and red horizontal deflection stages 72 and 74. With one primary coil having twice the number of turns (2 N) as the other primary coil (N) while being coupled to only one deflection stage, while the second primary coil is coupled to two deflection stages, a balanced magnetic flux condition is obtained in transformer 78 under normal operating conditions. This balance is disturbed should any of the three horizontal deflection yokes become open or short circuited. For example, if an open circuit develops in green horizontal deflection yoke 90, the magnetic flux in laminated iron core 110 produced by primary winding 106 would go to zero and a current would be induced in secondary coil 112. Similarily, if a short circuit should develop in green horizontal deflection coil 90, the current in primary sensing coil 106 would increase and the magnetic flux balance in transformer 78 would be disturbed resulting in a current being induced in secondary winding 112. In this manner, electrical irregularities in any of the three horizontal deflection yokes produce an output signal in secondary winding 112 of balanced transformer 78. A master linearity control 108 is shown coupled to the junction of primary sensing coils 104 and 106 to provide a single inductive control over the horizontal linearity of the video display. Finally, by properly orienting the primary sensing coils in the systems of FIGS. 2 and 3, such that their magnetic fields entirely cancel, the need for a transformer core may be avoided altogether.

With one end of secondary winding 112 coupled to neutral ground potential, the output signal is provided to horizontal shutdown circuitry via diode 114, capacitor 116 and resistor 118 which provide rectification and filtering for the horizontal shutdown signal. In the present invention, the DC output signal is provided to electron beam shutdown circuitry which terminates electron beam current in each of the CRT's when a current imbalance between primary sensing coils 104 and 106 is detected in bridge transformer 78.

In a practical example of the present invention, the following values are assigned to various components of vertical deflection phosphor protection circuit 11 and horizontal deflection phosphor protection circuit 70 to provide the previously discussed CRT phosphor burn protection in a multiple CRT projection television system:

| Reference No. | Preferred Value |
| --- | --- |
| 22 | 6–7 Millihenries |
| 24 | 6–7 Millihenries |
| 26 | 6–7 Millihenries |
| 40 | 330 Ohms |
| 42 | 330 Ohms |
| 44 | 330 Ohms |
| 46 | 1000 Microfarads |
| 48 | 1000 Microfarads |
| 50 | 1000 Microfarads |
| 56 | 0.47 Microfarads |
| 62 | 47 Microfarads |
| 64 | 180 Kilohms |
| 66 | 20 Kilohms |
| 86 | 3.5 Millihenries |
| 88 | 3.5 Millihenries |
| 90 | 3.5 Millihenries |
| 98 | 0.33 Microfarads |
| 100 | 0.33 Microfarads |
| 102 | 0.33 Microfarads |
| 116 | 0.01 Microfarads |
| 118 | 2.2 Kilohms |

There has thus been shown a phosphor protection circuit for use in the vertical and horizontal deflection systems of a multiple CRT projection television system. An unbalanced bridge transformer approach is used to detect short and open circuits in vertical and horizontal deflection yokes to provide a shutdown signal in response thereto for immediately terminating CRT operation in the event of a deflection yoke malfunction. While FIG. 2 shows a protection system for use in the vertical deflection system of a multiple CRT projection television system, it could equally as well be utilized in the horizontal deflection system in a projection television receiver. Similarily, the protection system shown in FIG. 3 could be utilized in the vertical deflection system of such a receiver.

While particular embodiments of the present invention have been shown and described, it will be obvious to those skilled in the art that changes and modifications may be made without departing from the invention in its broader aspects and, therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

I claim:

1. In a projection color television system having a projecting screen, three cathode ray tubes each having a phosphor screen for producing, by means of an electron beam incident upon said phosphor screen, and projecting onto said projecting screen a different one of the three primary colors of a light beam containing image information therein, and a vertical deflection coil in each of said cathode ray tubes for deflecting said electron beams across said projecting screen in a vertical direction by means of vertical deflection signals provided to said deflection coils, a protection system comprising:

means for connecting said vertical deflection coils serially;

transformer means including a core, three primary windings each connected in parallel across one of said vertical deflection coils and a secondary winding coupled inductively to said primary windings, with two of said primary windings each having N turns and a first winding polarity and the third primary winding having 2 N turns and a second winding polarity opposite to said first polarity, such that said transformer is balanced when all of said deflection coils transmit said vertical deflection signals with no signal induced in said secondary winding; and shutdown means coupled to said secondary winding and to said cathode ray tubes for receiving a signal induced in said secondary winding due to transformer imbalance caused by a discontinuity in the current transmitted by one or more of said primary coils and terminating the electron beam in each said cathode ray tubes in response thereto.

2. A protection system as in claim 1 further comprising capacitive means coupled serially between said vertical deflection coils to provide DC isolation between said individual deflection coils.

3. A protection system as in claim 1 further comprising resistive means coupled in parallel with each of said deflection coils and serially to each of said associated primary coils so as to reduce the current passing through each of said primary coils to a small value relative to the current passing through said deflection coils.

4. A protection system as in claim 1 further comprising vertical linearity, centering and size control circuitry connected in parallel across each of said deflection coils.

5. A protection system as in claim 1 wherein said shutdown means includes signal rectification and filtering means for providing a DC output signal to each of said cathode ray tubes in terminating the electron beam therein.

6. A protection system as in claim 5 wherein said DC output signal is provided by said shutdown means to vertical blanking control circuitry in terminating the electron beam in each of said cathode ray tubes.

7. In a projection color television system having a generally flat projecting screen, three cathode ray tubes each having a phosphor screen for producing, by means of an electron beam incident upon said phosphor screen, and projecting onto said projecting screen a different one of the three primary colors of a light beam containing image information therein, and a horizontal deflection coil in each of said cathode ray tubes for deflecting said electron beams across said projecting screen in a horizontal direction by means of horizontal deflection signals provided to said deflection coils, a protection system comprising:

means for connecting two of said horizontal deflection coils in parallel;

transformer means including a core, a first primary winding coupled to the parallel configuration of said two horizontal deflection coils and having N turns and a first winding polarity, a second primary winding coupled to said third horizontal deflection coil and having 2 N turns and a second winding polarity opposite to said first polarity, and a secondary winding coupled inductively to said priamry windings with said transformer being balanced when all of said deflection coils transmit said horizontal deflection signals with no signal induced in said secondary winding; and shutdown means coupled to said secondary winding and to said cathode ray tubes for receiving a signal induced in said secondary winding due to transformer imbalance caused by a discontinuity in the current transmitted by one or more of said primary coils and terminating the electron beam in each of said cathode ray tubes in response thereto.

8. A protection system as in claim 7 further comprising capacitive means coupled serially between each of said horizontal deflection coils and respective primary windings to impose an S-correction factor upon the horizontal deflection signals provided to said deflection coils in compensating for image distortion caused by the flatness of said projecting screen.

9. A protection system as in claim 7 further comprising variable horizontal linearity controls each coupled serially with a respective one of said horizontal deflection coils.

10. A protection system as in claim 7 further comprising signal rectification and filtering means coupling said secondary winding to electron beam shutdown circuitry for providing a DC output signal thereto if a flux imbalance occurs between said first and second primary windings.

11. In a projection color television system having a projecting screen, three cathode ray tubes each having a phosphor screen for producing, by means of an electron beam incident upon said phosphor screen, and projecting onto said projecting screen a different one of the three primary colors of a light beam containing image information therein, and a vertical deflection coil in each of said cathode ray tubes for deflecting said electron beams across said projecting screen in a vertical direction by means of vertical deflection signals provided to said deflection coils, a protection system comprising:

capacitive means for connecting said vertical deflection coils serially;

transformer means including a core, three primary windings each connected in parallel across one of said vertical deflection coils and a secondary winding coupled inductively to said primary windings, with two of said primary windings each having N turns and a first winding polarity and the third primary winding having 2 N turns and a second winding polarity opposite to said first polarity, such that said transformer is balanced when all of said deflection coils transmit said vertical deflection signals with no signal induced in said secondary winding;

resistive means coupled in parallel with each of said deflection coils and serially to each of said associated primary coils so as to reduce the current passing through each of said primary coils to a small value relative to the current passing through said deflection coils; and shutdown means coupled to said secondary winding and to said cathode ray tubes for receiving a signal induced in said secondary winding due to transformer imbalance caused by a discontinuity in the current transmitted by one or more of said primary coils, said shutdown means including rectification and filtering means for providing a DC output signal to vertical blanking control circuitry in terminating electron beam current in each of said cathode ray tubes.

12. In a projection color television system having a generally flat projecting screen, three cathode ray tubes each having a phosphor screen for producing, by means of an electron beam incident upon said phosphor screen, and projecting onto said projecting screen a different one of the three primary colors of a light beam containing image information therein, and a horizontal deflection coil in each of said cathode ray tubes for deflecting said electron beams across said projecting screen in a horizontal direction by means of horizontal deflection signals provided to said deflection coils, a protection system comprising:

means for connecting two of said horizontal deflection coils in parallel;

transformer means including a core, a first primary winding coupled to the parallel configuration of ssaid two horizontal deflection coils and having N turns and a first winding polarity, a second primary winding coupled to said third horizontal deflection coil and having 2 N turns and a second winding polarity opposite to said first polarity, and a secondary winding coupled inductively to said primary windings with said transformer being balanced when all of said deflection coils transmit said horizontal deflection signals with no signal induced in said secondary winding;

capacitive means coupled serially between each of said horizontal deflection coils and respective primary winding to impose an S-correction factor upon the horizontal deflection signals provided to said deflection coils in compensating for image distortion caused by the flatness of said projecting screen; and shutdown circuit means coupled to said secondary winding and to said cathode ray tubes for receiving a signal induced in said secondary winding due to transformer imbalance caused by a discontinuity in the current transmitted by one or more of said primary coils and terminating the electron beam in each of said cathode ray tubes in response thereto.

13. In a projection color television system having a projecting screen, three cathode ray tubes each having a phospher screen for producing, by means of an electron beam incident upon said phosphor screen, and projecting onto said projecting screen a different one of the three primary colors of a light beam containing image information therein, and a deflection coil in each of said cathode ray tubes for deflecting said electron beams across said projecting screen by means of deflection signals provided to said deflection coils, a protection system comprising:

means for connecting said deflection coils serially;

transformer melans including a core, three primary windings each connecteed in parallel across one of said deflection coils and a secondary winding coupled inductively to said primary windings, with two of said primary windings each having N turns and a first winding polarity and the third primary winding having 2 N turns and a second winding polarity opposite to said first polarity, such that said transformer is balanced when all of said deflection coils transmit said deflection signals with no signal induced in said secondary winding; and shutdown means coupled to said secondary winding and to said cathode ray tubes for receiving a signal induced in said secondary winding due to transformer imbalance caused by a discontinuity in the current transmitted by one or more of said primary coils and terminating the electron beam in each of said cathode ray tubes in response thereto.

14. A protection system as in claim 13 further comprising capacitive means coupled serially between said deflection coils to provide DC isolation between said individual deflection coils.

15. A protection system as in claim 13 further comprising resistive means coupled in parallel with each of said deflection coils and serially to each of said associated primary coils so as to reduce the current passing through each of said primary coils to a small value relative to the current passing through said deflection coils.

16. A protection system as in claim 13 further comprising linearity, centering and size control circuitry connected in parallel across each of said deflection coils.

17. A protection system as in claim 13 wherein said shutdown means includes signal rectification and filtering means for providing a DC output signal to each of said cathode ray tubes in terminating the electron beam therein.

18. A protection system as in claim 17 wherein said DC output signal is provided by said shutdown means to blanking control circuitry in terminating the electron beam in each of said cathode ray tubes.

19. In a projection color television system having a generally flat projecting screen, three cathode ray tubes each having a phosphor screen for producing, by means of an electron beam incident upon said phosphor screen, and projecting onto said projecting screen a different one of the three primary colors of a light beam containing image information therein, and a deflection coil in each of said cathode ray tubes for deflecting said electron beams across said projecting screen by means of deflection signals provided to said deflection coils, a protection system comprising:

means for connecting two of said deflection coils in parallel;

transformeer means including a core, a first primary winding coupled to the parallel configuration of said two deflection coils and having N turns and a first winding polarity, a second primary winding coupled to said third deflection coil and having 2 N turns and a second winding polarity opposite to said first polarity and a secondary winding coupled inductively to said primary windings with said transformer being balanced when all of said deflection coils transmit said deflection signals with no signal induced in said secondary winding; and shutdown means coupled to said secondary winding and to said cathode ray tubes for receiving a signal induced in said secondary winding due to transformer imbalance caused by a discontinuity in the current transmitted by one or more of said primary coils and terminating the electron beam in each of said cathode ray tubes in response thereto.

20. A protection system as in claim 19 further comprising capacitive means coupled serially between each of said deflection coils and respective primary windings to impose an S-correction factor upon the deflection signals provided to said deflection coils in compensating for image distortion caused by the flatness of said projecting screen.

21. A protection system as in claim 19 further comprising variable linearity controls each coupled serially with a respective one of said deflection coils.

22. A protection system as in claim 19 further comprising signal rectification and filtering means coupling said secondary winding to electron beam shutdown circuitry for providing a DC output signal thereto if a flux imbalance occurs between said first and second primary windings.

23. In a projection color television system having a projecting screen, three cathode ray tubes each having a phosphor screen for producing, by means of an electron beam incident upon said phosphor screen, and projecting onto said projecting screen a different one of the three primary colors of a light beam containing image information therein, and a deflection coil in each of said cathode ray tubes for deflection said electron beams across said projecting screen by means of deflection signals provided to said deflection coils, a protection system comprising:
  means for connecting said deflection coils serially;
  transformer means including three primary windings each connected in parallel across one of said deflection coils and a secondary winding coupled inductively to said primary windings, with two of said primary windings eachh having N turns and a first winding polarity and the third primary winding having 2 N turns and a second winding polarity opposite to said first polarity, such that said transformer is balanced when all of said deflection coils transmit said deflection signals with no signal induced in said secondary winding; and
  shutdown means coupled to said secondary winding and to said cathode ray tubes for receiving a signal induced in said secondary winding due to transformer imbalance caused by a discontinuity in the current transmitted by one or more of said primary coils and terminating the electron beam in each of said cathode ray tubes in response thereto.

24. In a projection color television system having a generally flat projecting screen, three cathode ray tubes each having a phosphor screen for producing, by means of an electron beam incident upon said phosphor screen, and projecting onto said projecting screen a different one of the three primary colors of a light beam containing image information therein, and a deflection coil in each of said cathode ray tubes for deflecting said electron beams across said projecting screen by means of deflection signals provided to said deflection coils, a protection system comprising:
  means for connecting two of said deflection coils in parallel;
  transformer means including a first primary winding coupled to the parallel configuration of said two deflection coils and having N turns and a first winding polarity, a second primary winding coupled to said third deflection coil and having 2 N turns and a second winding polarity opposite to said first polarity, and a secondary winding coupled inductively to said primary windings with said transformer being balanced when all of said deflection coils transmit said deflection signals with no signal induced in said secondary winding; and
  shutdown means coupled to said secondary winding and to said cathode ray tubes for receiving a signal induced in said secondary winding due to transformer imbalance caused by a discontinuity in the current transmitted by one or more of said primary coils and terminating the electron beam in each of said cathode ray tubes in response thereto.

* * * * *